United States Patent Office 3,527,827
Patented Sept. 8, 1970

3,527,827
SYNTHESIS OF MONOCYCLIC TERPENES
George E. Illingworth, Arlington Heights, Ill., assignor to Universal Oil Products Company, Des Plaines, Ill., a corporation of Delaware
No Drawing. Filed Oct. 25, 1968, Ser. No. 770,855
Int. Cl. C07c *13/00;* C09f *3/00*
U.S. Cl. 260—675.5
6 Claims

ABSTRACT OF THE DISCLOSURE

Monocyclic terpenes may be prepared by reacting a conjugated diolefinic hydrocarbon with a substituted allene at reaction conditions which include an elevated temperature and elevated pressure. This process is illustrated by the production of terpinolene by condensing isoprene and dimethyl allene at 75° C. and 50 atm. for 4 hours.

---

This invention relates to a process for the preparation of monocyclic terpenes. More particularly, the invention is concerned with a process for preparing monocyclic terpenes which possess desirable physical characteristics, said process involving the reaction of a diolefinic hydrocarbon in which the unsaturation is conjugated in configuration with a substituted allene under reaction conditions of a type hereinafter set forth in greater detail.

Monocyclic terpenes, and particularly those which possess desirable physical characteristics, are important compounds in the chemical field. Specifically speaking many monocyclic terpenes possess desirable physical characteristics such as pleasant fragrant odors. These compounds play an important role in the synthesis of pleasing fragrances which are compounded into perfumes, colognes, aftershave lotion, soaps, detergents, talcums, bath salts, cosmetics, bath oils, etc. Heretofore, many of the compounds or chemicals which possess the desirable odors, among which are the fruity odors, sandalwood odors, flower odors, and fixitives such as the musk odors are naturally occurring in origin. In order to recover the desirable chemicals, it was necessary to collect and process the leaves, flowers, roots, or animal sources of these particular aroma chemicals. However, the manufacturers of these chemicals were subjected to the whims and vageries of nature, and therefore, could not be certain of having a constant supply of the necessary raw materials due to adverse climatic conditions or other elements which would disrupt their source of supply. In recent years, efforts have been made to synthesize these naturally occurring chemicals in order to insure a constant source of supply of the desired chemicals.

In view of this, it is therefore an object of this invention to provide a process for preparing monocyclic terpenes which possess desirable physical characteristics.

In one aspect, an embodiment of this invention is found in a process for the preparation of a monocyclic terpene which comprises reacting a conjugated diolefinic hydrocarbon with a substituted allene at reaction conditions which include an elevated temperature and elevated pressure, and recovering the resultant monocyclic terpene.

A specific embodiment of this invention is found in a process for the preparation of a monocyclic terpene which comprises reacting isoprene with unsym.-dimethyl allene at a temperature within the range of 50° to 300° C. and a pressure in the range of from 2 to 100 atmospheres and recovering the resultant terpinolene.

Other objects and embodiments will be found in the following further detailed description of the present invention.

As hereinbefore set forth, the present invention is concerned with a process for the preparation of monocyclic terpenes by reacting a conjugated diolefinic hydrocarbon with a substituted allene at elevated temperatures and pressures. A specific example of this is the preparation of terpinolene which is used in the fragrance industry as a component of perfumes, colognes, etc. The natural source of terpinolene is coriander oil. The naturally occurring coriander oil, which is a colorless liquid possessing an aromatic odor, is derived from a distillation from the fruit of Coriandrum Sativum, the dried ripe fruit being the coriander seed. However, as previously discussed, the possibility of obtaining a constant source of this is subject to many variables and therefore it is to the advantage of perfumers or other manufacturers to have a synthetic source which is readily and constantly available.

The monocyclic terpenes are prepared by the ring condensation of a conjugated diolefinic hydrocarbon with a lower-alkyl substituted allene. Examples of conjugated diolefinic hydrocarbons which may be employed will include 1,3-butadiene, 2-methyl 1,3-butadiene (isoprene), 1,3-pentadiene, 2-methyl 1,3-pentadiene, 3-methyl 1,3-pentadiene, 2-methyl 2,4-pentadiene, 1,3-hexadiene, 2-methyl 1,3-hexadiene, 2,4-hexadiene, etc. Examples of substituted allenes which may be used include unsym.-dimethyl allene, unsym.-diethyl allene, unsym.-dipropyl allene, unsym.-ethylmethyl allene, unsym.-methylpropyl allene, etc. It is also contemplated that the symmetrically disubstituted allenes may also be used, although not necessarily with equivalent results.

The ring condensation is effected at elevated temperatures and pressures, the temperature which is used being in a range of from about 50° to about 300° C. or more, and said pressure which is used being in a range of from about 2 to 100 atmospheres. It is contemplated within the scope of this invention that the ring condensation may be effected in either a vapor or liquid phase. When it is desired to effect the ring condensation in a liquid phase, the pressure which is used is that which is sufficient to maintain a major portion of the reactants in the liquid phase and will be provided for by the introduction of an inert gas such as nitrogen into the reaction zone in an amount sufficient to attain the desired pressure.

The process of the present invention may be effected in any suitable manner and may comprise either a batch or continuous type operation. For example, when a batch type operation is used, a quantity of the desired starting material comprising the conjugated diolefinic hydrocarbon and the substituted allene hydrocarbon is placed in an appropriate condensation apparatus. This apparatus may comprise an alkylation flask provided with heating and stirring means, or if superatmospheric pressures are to be employed, an autoclave of the rotating or mixing type. In a preferred embodiment of the invention, the ring condensation of the compounds is effected at elevated pressures and therefore an autoclave will be used. The autoclave is sealed and nitrogen is pressed in until the desired operating pressure has been reached. Thereafter, the apparatus is heated to the desired reaction temperature and maintained thereat for a predetermined period of time ranging from about 0.5 up to about 10 hours or more in duration. At the end of this time, the flask and contents thereof are allowed to return to room temperature, the excess pressure is discharged, and the autoclave is opened. The reaction mixture is removed from the autoclave and subjected to fractional distillation, usually under reduced pressure, whereby the desired monocyclic terpene is separated from the unreacted starting materials and/or side reaction products which may have formed during the condensation.

Another method of effecting the ring condensation of the present process is in a continuous manner of operation. When such a type of operation is used, the starting materials comprising a diolefinic hydrocarbon which is conjugated in nature and the disubstituted allene, usually of an unsymmetrical nature, are continuously charged to a reaction vessel which is maintained at the proper operation conditions of temperature and pressure. The starting materials may be charged to the reactor through separate lines or, if so desired, may be admixed prior to entry into said reactor and charged thereto in a single stream. Upon completion of the desired residence time, the reactor effluent is continuously drawn and subjected to conventional separation means whereby the desired monocyclic terpene is separated from the diolefinic hydrocarbon and the disubstituted allene, the latter two being recycled to form a portion of the feed stock while the former is removed to storage.

The following example is given to illustrate the process of the present invention which, however, is not intended to limit the generally broad scope of the present invention in strict accordance therewith.

EXAMPLE I

In this example 68 grams (1.0 mole) of 2-methyl 1,3-butadiene (isoprene) and 68 grams (1.0 mole) of unsym.-dimethyl allene are placed in the glass liner of a rotating autoclave. The liner is sealed into the autoclave and nitrogen pressed in until an initial pressure of 50 atmospheres is reached. The autoclave is then heated to a temperature of 75° C. and maintained thereat for a period of 4 hours. At the end of this time, heating is discontinued and the autoclave is allowed to return to room temperature. The excess pressure is discharged and the reaction mixture is recovered from said autoclave. The mixture is then subjected to fractional distillation under reduced pressure whereby the desired product comprising the monocyclic terpinolene is separated and recovered.

I claim as my invention:

1. A process for the preparation of a monocyclic terpene which comprises reacting a conjugated diolefinic hydrocarbon with a lower-alkyl substituted allene at reaction conditions which include an elevated temperature and elevated pressure, and recovering the resultant monocyclic terpene.

2. The process as set forth in claim 1 in which said temperature is in a range of from about 50° to about 300° C. and said pressure is in a range of from about 2 to about 100 atmospheres.

3. The process as set forth in claim 1 in which said allene is unsymmetrically substituted.

4. The process as set forth in claim 1 in which said conjugated diolefinic hydrocarbon comprises isoprene.

5. The process as set forth in claim 1 in which said substituted allene comprises unsym.-dimethyl allene.

6. The process as set forth in claim 1 in which said monocyclic terpene comprises terpinolene.

References Cited

UNITED STATES PATENTS

| | | | |
|---|---|---|---|
| 1,436,819 | 11/1922 | Plauson | 260—666 |
| 1,868,127 | 7/1932 | Winkler et al. | 260—666 |
| 2,431,403 | 11/1947 | Johnson et al. | 260—666 |
| 3,352,937 | 11/1967 | Chini et al. | 260—680 |

DELBERT E. GANTZ, Primary Examiner

G. E. SCHMITKONS, Assistant Examiner